May 21, 1940.   A. NINNELT   2,201,498

QUICK SWITCHING DEVICE

Filed Jan. 10, 1939

Inventor:
A. Ninnelt,
By E. F. Wenderoth
Atty

Patented May 21, 1940

2,201,498

UNITED STATES PATENT OFFICE 2,201,498

QUICK SWITCHING DEVICE

Alfred Ninnelt, Freiburg (Breisgau), Germany, assignor to the firm of Fabrik Elektr. Apparate Fr. Suter A. G., Basel, Switzerland Application January 10, 1939, Serial No. 250,251
In Switzerland January 19, 1938

2 Claims. (Cl. 74—100)

The present invention relates to a rapid actuating device for switches and has for its object to provide an improved device for rapidly operating a switch, a valve or the like as soon as an abutment (movable partition) subject to variable pressure reaches a predetermined limit of pressure. The device according to the invention mainly comprises a cylindrical bolt adapted to transmit the movement of the abutment to the member to be controlled, the surface of this bolt being provided with one or more annular grooves, and the bolt being arranged to slide in a sleeve which does not participate in the movement of the bolt.

The bolt is normally prevented from moving by one or more balls pressed under the action of spring pressure into one of its annular grooves, these balls being arranged in radial bores arranged in a plane at right angles to the axis of the sleeve. As soon as the axial pressure exerted on the bolt is sufficient to overcome the resistance opposed by the balls to the sliding movement of the bolt, the latter is suddenly moved in one direction or the other and thus the intended switching movement is released.

The limits of pressure at which this movement is effected are influenced on the one hand by the shape and depth of the annular grooves, and on the other hand by the tension of the spring acting upon the balls. By varying the tension of the spring it is possible to adjust the switching limits even during service. In order to enable the spring loads of all the balls distributed over the circumference to be adjusted simultaneously, a conical surface is provided as a counter support for the counter bolts of the springs; by displacing this surface in the direction of the axis of the cone the tension of all springs is uniformly varied.

In order that the invention may be more readily understood a number of constructional examples are illustrated in the accompanying drawing in which—

Figure 1:
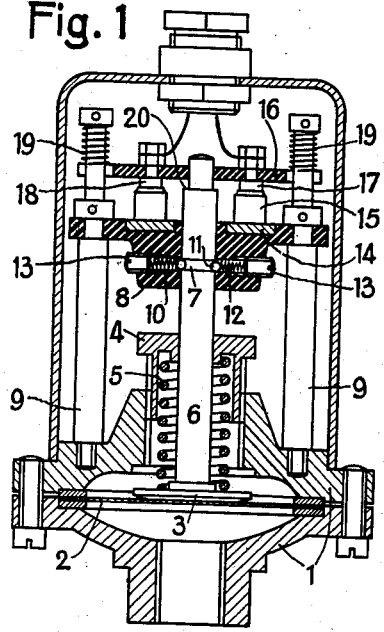
Figure 1 is a longitudinal section of a pressure-control device comprising a rapid switching mechanism according to the invention.

Referring now to the drawing, 1 (Figure 1) is a diaphragm casing of known construction comprising a diaphragm 2 subjected to the action of the pressure to be supervised. This diaphragm is loaded through the intermediary of the spring plate 3 by means of a spring 5 which is adjustable by means of a screw cap 4. The spring plate is rigidly connected with a smooth cylindrical bolt 6 of the rapid-switching device; an annular groove 7 is provided on the surface of this bolt. The latter is slidably arranged in a sleeve 8 of insulating material, which is secured by means of columns or studs 9 on the diaphragm casing and does not participate in the movement of the diaphragm.

Two bores 10 are provided in the sleeve 8 and are disposed in a plane at right angles to the axis of the sleeve. Balls 11 are accommodated in these bores and are pressed by springs 12 into the annular groove of the bolt 6. Screws 13, which form the counter supports of the springs, enable the tension of the springs to be adjusted.

The contact device which is mounted on the sleeve 8 comprises the two fixed contacts 15 conductively connected by a metal ring 14, and the contact bridge 16, on which the movable contacts 17 and 18 are mounted. The contact bridge is guided on the studs 9 and pressed downwardly by means of springs 19 so that the electric circuit is closed through the contacts 17 and 18, the counter contacts 15, and the metal ring 14.

When the pressure below the diaphragm is increased until the resistance opposed by the balls 11 to the sliding movement of the bolt 6 is overcome, the bolt is moved upwardly and, by carrying with it the contact bridge 17 by means of a shoulder 20 provided on the bolt, it will bring about a sudden interruption of the circuit, the bolt sliding rapidly between the balls 11 under the pressure acting unto the diaphragm 2. When the pressure is subsequently decreased, the bolt will gradually move downwardly under the action of the return spring 5 until the balls 11 again engage into the annular groove 7, the contacts being closed again at the same time.

Figure 2:
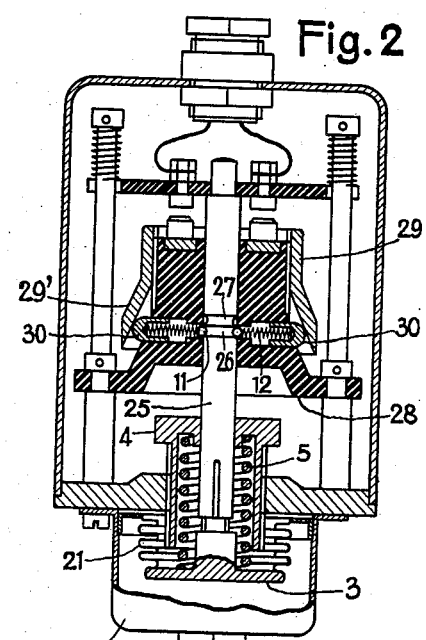
Figure 2 is a longitudinal section of a thermostat of the capillary-tube type equipped with the rapid-switching device according to the invention.

The device shown in Figure 2 is a thermostat. Instead of a diaphragm a resilient bellows-like tube 21 is provided, this tube being enclosed in a casing 22, which is connected with a temperature feeler 24 comprising a low-boiling liquid, through a capillary 23. When the temperature varies, the pressure in the feeler member 24 and in the resilient tube 21 is correspondingly altered. A spring 5, which may be adjusted by means of a screw cap 4, serves as opposing force acting upon the bolt plate 3. The latter is adjustably connected to the bolt 25 corresponding to the bolt 6 of Figure 1 and serving as before for transmitting the movement to a suitable contact device. In this case two annular grooves 26 and 27 are provided adjacent to each other in the bolt 25, which is adapted to slide in a sleeve 28 of insulating material, which is provided with bores accommodating balls 11 engaging into the annular grooves of the bolt under the action of springs 12.

In order to facilitate the re-adjustment of the springs, the upper portion of the sleeve 28 is provided with screw threads into which an annular nut 29 engages. A lower portion of this nut is widened in the form of a funnel 29' so as to provide a tapered hole, against the surface of which the counter support bolts 30 of the springs 12 are supported with their spherical outer ends.

The operation of the device is as follows, when starting from the closed position of the switch. When the temperature increases and the pressure in the spring tube casing 22 is correspondingly increased the locking action of the balls 11 in the annular groove 27 will suddenly cease when the preadjusted switching limit is reached, and the bolt 25 will be moved quickly upwardly, the balls 11 snapping over the partition between the two grooves to lock the bolt in the groove 26.

Owing to this the switch is rapidly opened (see position shown in the drawing) whereupon the movement of the bolt is arrested by the fact that the ball engages into the lower annular groove 26. The circuit is closed again as soon as the temperature and correspondingly the pressure has dropped again to such an extent that the spring 5 is able to overcome the resistance produced by the engagement of the balls into the groove 26. By adjusting the position of the annular nut 29, it is possible to regulate the action of the springs 12 and accordingly the difference of pressure at which the switch will operate. By moving the annular nut upwardly, the tension of the springs 12 is reduced and the difference decreased, whereas it will be correspondingly increased by screwing the nut downwardly.

Figure 3:
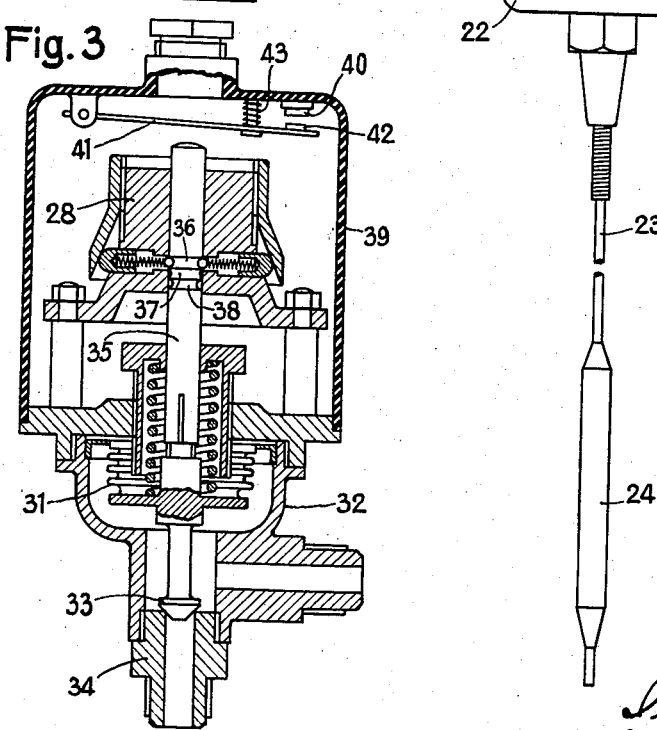
Figure 3 is a section through a pop-action valve which is also provided with signal contacts.

In the construction illustrated in Figure 3 the spring control member 31 is mounted in a valve casing 32 and directly connected with a valve body 33 adapted to close the valve seat 34 and thus to cut off the outlet from the valve. The construction of the rapid-switching device is identical with that shown in Figure 2 except for the fact that three annular grooves 36, 37 and 38 are provided in the bolt 35 sliding within the sleeve 28, the depth of the central groove 37 being less than that of the outer grooves 36 and 38. In this example the contact device is accommodated in a protective casing 39 made of insulating material and comprises a fixed contact 40 and a movable contact 42 mounted on a lever 41, the contacts being kept apart by a spring 43.

Valves of this type are used when individual branches of a pipe system are to be connected and disconnected within predetermined adjustable limits of pressure. For example, when an evaporator is to be connected and disconnected in the circuit of the cooling medium of a cooling system comprising a number of evaporators, the operation is as follows.

When a pre-determined temperature and correspondingly a pre-determined pressure is reached in the evaporator controlled by the valve, the locking action of the balls in the annular grooves 36 will be overcome by the spring control body 31, and the bolt 35 will be lifted so as to open the valve 33 suddenly until the balls engage into the annular groove 37. When the pressure decreases subsequently, the bolt 35 is moved back and the valve 33 closed again.

If when the valve is open, nevertheless the pressure increases still further, the locking action due to the engagement of the balls into the annular groove 37 will also be overcome, and the bolt 35 will move further upward until it rests in the annular groove 38. At the same time the contacts 40 and 42 are closed so as to indicate the disturbance by a suitable optical or acoustical signal. The switching jump when passing from the annular groove 37 to the annular groove 38 is less than that from the annular groove 36 to the annular groove 37, because the latter is of relatively small depth.

It will be evident that the rapid-switching device according to the invention may be constructed different from the examples described hereinabove. For example, three annular grooves may be provided for a change over switch provided with a central neutral position, and the switching steps may be chosen very different from one another by a corresponding construction of the grooves. Furthermore, the device according to the invention may be used for suddenly displacing a control piston, a slide valve, or any other device which is to be moved in a jumping manner.

What I claim is:

1. A quick-action control device comprising a motor member subject to the action of a variable controlling force, a movable control member, a fixed guiding sleeve, a cylindrical bolt slidably mounted in said guiding sleeve for transmitting movement from said motor member to said control member, a plurality of radial bores in said sleeve, a ball in each of said bores and a spring arranged in each bore at the rear of said ball for pressing said ball against said bolt, said bolt having an annular groove in the surface thereof at such a position that said ball is in engagement with said groove when said control member is in one of its control positions, a counter-bolt in each bore at the rear of said spring, a hollow cone shell surrounding said sleeve coaxially, said hollow cone shell being in contact with its internal conical face with said counter-bolts, and means for adjustably displacing said shell in the axial direction of said sleeve.

2. A quick-action control device as claimed in claim 1, in which said hollow cone shell is formed as a rotatable screw nut so that adjustment thereof may be obtained by screwing said nut up and down.

ALFRED NINNELT.